(12) United States Patent
Muir

(10) Patent No.: US 9,844,022 B2
(45) Date of Patent: *Dec. 12, 2017

(54) COMMUNICATION LINK TERMINATION INDICATION SIGNAL METHOD AND APPARATUS

(71) Applicant: Brockett Muir, Charlottesville, VA (US)

(72) Inventor: Brockett Muir, Charlottesville, VA (US)

(73) Assignee: First Circle, LLC, Charlottesville, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/166,975

(22) Filed: May 27, 2016

(65) Prior Publication Data

US 2017/0135065 A1    May 11, 2017

Related U.S. Application Data

(63) Continuation of application No. 14/731,297, filed on Jun. 4, 2015, now Pat. No. 9,357,522, which is a continuation of application No. 14/536,449, filed on Nov. 7, 2014, now Pat. No. 9,055,583, which is a continuation of application No. 13/919,334, filed on Jun. 17, 2013, now Pat. No. 8,886,171, which is a continuation of application No. 11/757,800, filed on Jun. 4, 2007, now abandoned, which is a continuation-in-part of application No. 11/437,754, filed on May 18, 2006, now abandoned, which is a
(Continued)

(51) Int. Cl.
    *H04M 1/725*     (2006.01)
    *H04M 19/04*     (2006.01)
    *H04W 68/00*     (2009.01)
    *H04W 76/06*     (2009.01)

(52) U.S. Cl.
    CPC ....... *H04W 68/00* (2013.01); *H04M 1/72519* (2013.01); *H04M 19/041* (2013.01); *H04W 76/06* (2013.01)

(58) Field of Classification Search
    CPC . H04W 68/00; H04W 76/06; H04M 1/72519; H04M 19/041
    See application file for complete search history.

(56) References Cited

U.S. PATENT DOCUMENTS

| 3,947,643 A | 3/1976 | DeGraauw et al. |
| 4,008,380 A | 2/1977 | La Borde |

(Continued)

OTHER PUBLICATIONS

PCT International Search Report and Written Opinion of the International Searching Authority for PCT/US2006/05841 dated Apr. 19, 2007.

(Continued)

*Primary Examiner* — Qun Shen
(74) *Attorney, Agent, or Firm* — Niro McAndrews, LLC

(57) ABSTRACT

Upon detecting at a two-way communication device that a communication link has been terminated, the two-way communication device can provide a unique corresponding signal (such as a unique audible signal) to indicate such termination. Pursuant to one approach, a plurality of such unique signals are available and a specific one of the available signals is selected for use in a given circumstance using a selection criteria of choice.

19 Claims, 2 Drawing Sheets

Related U.S. Application Data continuation-in-part of application No. 11/075,249, filed on Mar. 8, 2005, now Pat. No. 7,684,830.

(56) References Cited

U.S. PATENT DOCUMENTS

| | | |
|---|---|---|
| 4,284,849 A | 8/1981 | Anderson et al. |
| 4,513,446 A | 4/1985 | Leslie |
| 4,540,850 A | 9/1985 | Herr et al. |
| 4,691,347 A | 9/1987 | Stanley et al. |
| 4,731,822 A | 3/1988 | Berry, III et al. |
| 5,335,268 A | 8/1994 | Kelly et al. |
| 5,426,692 A * | 6/1995 | Fujise ............... H04Q 11/0428 379/100.06 |
| 5,557,658 A | 9/1996 | Gregorek et al. |
| 6,031,899 A | 2/2000 | Wu |
| 6,094,587 A | 7/2000 | Armanto et al. |
| 6,097,952 A | 8/2000 | Kawabata |
| 6,310,543 B1 | 10/2001 | Yoshioka et al. |
| 6,476,306 B2 | 11/2002 | Huopaniemi et al. |
| 6,542,730 B1 * | 4/2003 | Hosain ............... H04M 1/67 455/410 |
| 6,611,596 B1 | 8/2003 | Cannon et al. |
| 6,650,751 B1 | 11/2003 | Becker |
| 6,718,187 B1 | 4/2004 | Takagi et al. |
| 6,791,583 B2 | 9/2004 | Tang et al. |
| 6,816,070 B1 | 11/2004 | Hsu et al. |
| 6,879,688 B2 | 4/2005 | Winegar |
| 6,882,860 B1 * | 4/2005 | Kim ............... H04M 19/041 379/211.01 |
| 6,901,139 B2 | 5/2005 | Gonzalez et al. |
| 6,907,239 B1 | 6/2005 | Sivula |
| 6,983,140 B2 | 1/2006 | Higuchi |
| 7,076,245 B1 | 7/2006 | Satapathy |
| 7,089,012 B2 | 8/2006 | Harris et al. |
| 7,248,900 B2 | 7/2007 | Deeds |
| 7,407,092 B2 * | 8/2008 | Silverbrook ............ B41J 11/009 235/380 |
| 7,489,768 B1 | 2/2009 | Strietzel |
| 7,684,830 B2 | 3/2010 | Muir |
| 7,813,490 B2 | 10/2010 | DeMent et al. |
| 7,856,230 B1 | 12/2010 | Jones |
| 8,582,567 B2 | 11/2013 | Kurapati et al. |
| 8,886,171 B2 | 11/2014 | Muir |
| 9,055,583 B2 | 6/2015 | Muir |
| 9,357,522 B2 | 5/2016 | Muir |
| 2002/0045445 A1 | 4/2002 | Higuchi |
| 2002/0090947 A1 | 7/2002 | Brooks et al. |
| 2003/0048885 A1 | 3/2003 | Adamczyk et al. |
| 2003/0050837 A1 | 3/2003 | Kim |
| 2003/0179887 A1 * | 9/2003 | Cronin ............... H03G 3/32 381/57 |
| 2004/0037402 A1 | 2/2004 | Adamczyk et al. |
| 2004/0058676 A1 | 3/2004 | Kato et al. |
| 2004/0120494 A1 | 6/2004 | Jiang et al. |
| 2004/0176079 A1 | 9/2004 | Fratti |
| 2004/0192210 A1 | 9/2004 | Park |
| 2004/0203645 A1 * | 10/2004 | Forman ............... H04M 3/2272 455/414.1 |
| 2004/0204168 A1 | 10/2004 | Laurila |
| 2005/0020236 A1 | 1/2005 | Mauney et al. |
| 2005/0058266 A1 | 3/2005 | Krause |
| 2005/0058268 A1 * | 3/2005 | Koch ............... H04W 68/005 379/207.16 |
| 2005/0094000 A1 | 5/2005 | Son et al. |
| 2005/0107066 A1 | 5/2005 | Erskine et al. |
| 2005/0107128 A1 * | 5/2005 | Deeds ............... H04M 19/041 455/567 |
| 2005/0117726 A1 * | 6/2005 | DeMent ............ H04M 3/42017 379/142.01 |
| 2005/0143060 A1 | 6/2005 | Narusawa |
| 2005/0148345 A1 | 7/2005 | Kawai et al. |
| 2005/0148354 A1 * | 7/2005 | Kim ............... H04M 19/041 455/466 |
| 2005/0221793 A1 * | 10/2005 | Chin ............... H04M 3/42017 455/401 |
| 2005/0243989 A1 | 11/2005 | Lee et al. |
| 2006/0023862 A1 | 2/2006 | Sutcliffe |
| 2006/0025122 A1 | 2/2006 | Harris et al. |
| 2006/0079295 A1 | 4/2006 | Chan |
| 2007/0116227 A1 | 5/2007 | Vitenson et al. |
| 2007/0211869 A1 | 9/2007 | Kiiskinen |
| 2007/0224984 A1 | 9/2007 | Muir |
| 2008/0020748 A1 | 1/2008 | Parker et al. |
| 2008/0194225 A1 | 8/2008 | Tischer et al. |

OTHER PUBLICATIONS

International Search Report from International Application No. PCT/US06/19845 dated Oct. 24, 2007.

* cited by examiner

COMMUNICATION LINK TERMINATION INDICATION SIGNAL METHOD AND APPARATUS

CROSS REFERENCE TO RELATED APPLICATIONS

This application is a continuation of U.S. patent application Ser. No. 14/731,297, filed Jun. 4, 2015, which is a continuation of U.S. patent application Ser. No. 14/536,449, filed Nov. 7, 2014, which is a continuation of U.S. patent application Ser. No. 13/919,334, 5 filed Jun. 17, 2013, which is a continuation of U.S. patent application Ser. No. 11/757,800, filed Jun. 4, 2007, which is a continuation-in-part of U.S. patent application Ser. No. 11/437,754, filed May 18, 2006 (now abandoned), which is a continuation-in-part of U.S. patent application Ser. No. 11/075,249, filed Mar. 8, 2005 (now U.S. Pat. No. 7,684,830, issued Mar. 23, 2010), the contents of each incorporated herein by reference.

TECHNICAL FIELD

This invention relates generally to communication link usage and more particularly to communication link status indication.

BACKGROUND

Communication devices comprise a generally well-understood area of endeavor including, but not limited to, two-way communications based upon, for example, wireless cellular telephony and the like. In many communication systems the system infrastructure will assign or otherwise facilitate the allocation of wireless resources (such as, but not limited to, radio frequency carriers, time slots, spreading codes, and so forth) to support a given communication session. The constituent elements and the totality of such allocated wireless resources can be viewed as a communication link.

There are times when confusion can arise with respect to whether a given communication link continues to persist or whether that link has, in fact, become terminated. For example, a given user may perceive, incorrectly, that a given communication link has been terminated when they conclude their conversation with another party but fail to take an appropriate action to actually effect the termination of that communication link (for example, some cellular telephones may require the user to assert an "END" button to cause the device to actively effect termination of a presently extant wireless communication link). When this occurs, the system will typically continue to monitor and track the duration of the communication link's persistence for accounting purposes. This, in turn, can lead to unexpected and undesired network usage, wasted resources, and higher-than-expected account billing for the user.

As another example, wireless communication links are subject to various operational circumstances that can lead to abrupt termination of the communication link. For example, a given user may move from one cell site to another cell site that has no currently available resources to commit to supporting a present conversation being conducted by that user. When this happens, there is typically no specific indication to the user that such a drop in services has occurred. Instead, the user may continue to engage in their part of the conversation until finally determining that they are receiving no response from the other party. Such circumstances can significantly negatively impact user experience, in part owing to the problem of determining how much information was actually conveyed to the other party in order to later continue that conversation with as little overlap or missed information content as possible.

BRIEF DESCRIPTION OF THE DRAWINGS

The above needs are at least partially met through provision of the communication link termination indication signal method and apparatus described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, pursuant to these various embodiments, upon determining that a communication link for a communication device is terminating, a unique corresponding signal is provided at the communication device to indicate termination of that communication link to a user of the communication device. In a preferred approach the corresponding signal is unique in that the signal is not used for other annunciation or notice purposes. For example, the communication device will not use this signal to also indicate the existence of an incoming call.

In a preferred approach the unique signal comprises an audible signal. In an optional but preferred approach, a plurality of candidate unique signals are available at the communication device. So configured, a user, for example, can select particular candidate unique signals to use in particular circumstances or settings to customize their user experience to their satisfaction. The unique signal itself can comprise any of a wide variety of audible or other content, including but not limited to musical content, verbal content, sound effects content, and so forth.

So configured, a user will receive a positive indication whenever a communication link being used by their communication device terminates. This, in turn, can be used to assure the user that the communication link is, in fact, operational at times when the user expects the communication link to be operational and terminated at times when the user expects termination to occur. If desired, these assurances are delivered in a customized and pleasing fashion that enhances and personalizes the user experience.

Figure 1:
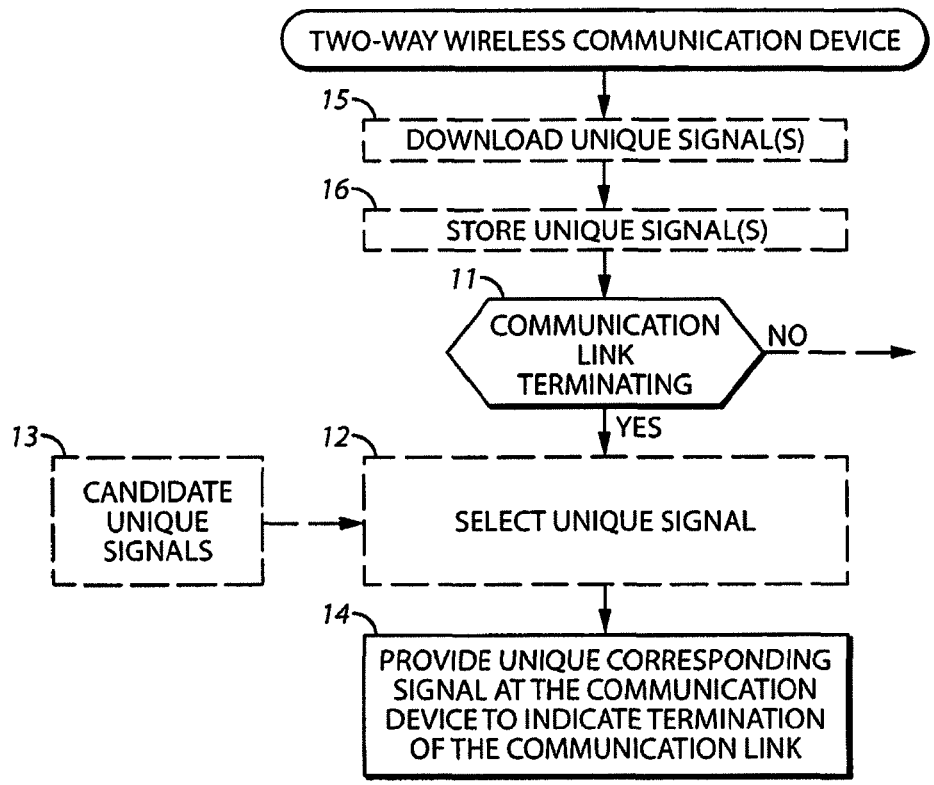
FIG. 1 comprises a flow diagram as configured m accordance with various embodiments of the invention.

These and other benefits may become clearer upon making a thorough review and study of the following detailed description. Referring now to the drawings, and in particular to FIG. 1, a two-way communication device of choice (such as, but not limited to, cellular telephones and other two-way radios of various kinds and types, including platforms having voice and/or data modes of operation) detects 11 when a presently established communication link is terminating. This can comprise, for example, determining at the communication device itself that a wireless communication link is terminating.

Various kinds of communication links are known in the art and consequently the details regarding detecting the termination of any particular communication will necessarily differ with variations in the enabling technology as will be well understood by those skilled in the art. In many cases the communication device will become aware of such termination when an otherwise present signal (such as a pilot signal, handshake signal, or other expected and recurrent signal) becomes absent. In other cases the communication device may become aware (or confirm) such termination by itself initiating a transmission to which no expected or required response occurs.

In the absence of detecting such termination, the communication device can continue with its other usual and ordinary activities. Upon detecting such termination, however, the communication device can optionally select 12 a unique signal (for example, from amongst a plurality of candidate unique signals 13). The unique signal will comprise, in general a user-discernable signal such as a unique auditory signal, visual signal, or haptic sensation (such as a vibration pattern).

In a preferred approach the unique signal comprises an audible signal. The audio signal content itself can comprise any known or hereafter-developed audio signal content including but not limited to a monophonic series of tones, a polyphonic series of tones, and/or digitized audio (such as MP3-compatible digitized audio). Such audio signal content examples are all well understood in the art and require no further elaboration here. In a preferred approach such an audible signal can comprise any audible content that is capable of uniquely identifying a termination event as disclosed below. A non-exhaustive listing of representative examples would include: a commercial jingle; a commercial tagline; a sound sample; a sound effect sample; verbal content; and music (including both instrumental music and music featuring sung lyrics). The signal can essentially have any desired duration. In many cases, it may be preferable to have a relatively short unique signal having a duration that does not exceed some predetermined maximum duration (such as, for example, three seconds, ten seconds, three minutes, and so forth).

When a plurality of such unique signals are available to a given communication device, this selection step 12 will typically comprise selection of a particular signal from amongst the plurality of available signals. The selection criteria itself can vary with the needs and/or requirements of a given application and setting. To illustrate, one can select a particular unique signal from amongst a plurality of available unique signals as a function, at least in part, of at least one of: a specific other communication party (for example, a specific one of the available unique signals can be used when signaling the termination of a communication link that had been used to facilitate a communication with a specific third party); a time of day (for example, one unique signal might be used to indicate termination of communication links as may occur prior to noon and another, different unique signal might be used to indicate termination of communication links as may occur following noon); a random selection amongst the available unique signals; the type of communication link that has been terminated (for example, one unique signal might be used to indicate termination of a cellular communication link and another, different unique signal might be used to indicate termination of a Bluetooth communication link); a duration of the communication link prior to being terminated (for example, one unique signal might be used to indicate termination of a communication link that has been active for less than five minutes and another, different unique signal might be used to indicate termination of a communication link that has been active for more than five minutes); to name but a few.

Pursuant to these teachings, the communication unit then provides 14 a unique corresponding signal at the communication device to indicate termination of the communication link. In a preferred approach the provided unique signal will comprise the previously selected unique signal when a particular signal has been optionally selected from amongst a plurality of unique signals as described above. Various ways are known in the art to effect the provision of such unique signals as are mentioned above. Furthermore, these teachings are not particularly sensitive to the selection and/or use of any particular approach in this regard. Therefore, for the sake of brevity and the preservation of narrative focus, further detailed description of such techniques will not be provided here.

As a more specific example, these teachings can be employed to facilitate a unique audible notice as to when a wireless communication link has become terminated for whatever reason. More particularly, at least one audible signal can be provided at a two-way wireless communication device, which audible signal is uniquely used to identify termination of the wireless communication link but which is not to be used to identify other events, conditions, and/or states at this communication device. Upon then detecting at the two-way wireless communication device that a given wireless communication link has been terminated, the audible signal can be rendered audible to thereby provide a unique audible signal to a user of the two-way wireless communication device that the given wireless communication link has been terminated.

Those skilled in the art will recognize that there are various ways to provision such a two-way communication device with one or more such unique signals. Pursuant to one approach, the device can simply be loaded with one or more such signals as a factory preset. Pursuant to another approach, and referring now again to FIG. 1, one or more such unique signals can optionally be downloaded 15 to the two-way communication device. Such downloading can be facilitated in any of a wide variety of manners in accordance with well understood prior art technique, including by transmission of the corresponding data to the two-way communication device using a wireless carrier channel.

Upon downloading such a signal, it will then typically be desirable to store 16 the downloaded unique signal for future use. Such storage can be conditioned as desired. For example, a pre-established limit may be provided to prevent storage and/or use of the downloaded signal beyond a given date, time, or event. In other cases, it may be preferable to permit unconditioned use of downloaded unique signals.

Figure 2:
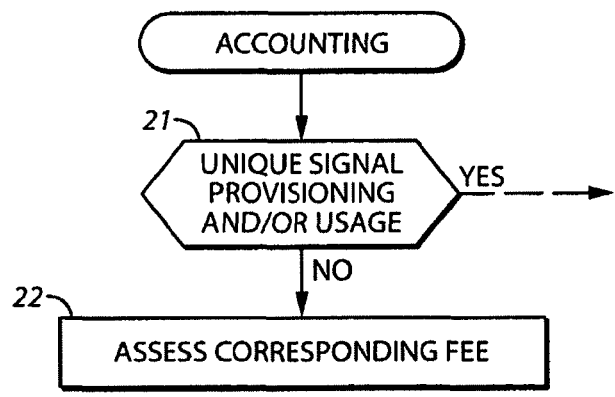
FIG. 2 comprises a flow diagram as configured m accordance with various embodiments of the invention.

Optionally, and referring now to FIG. 2, upon provisioning and/or being otherwise informed of usage of such unique signals 21 with respect to a given two-way communication device, an appropriate accounting platform for the service provider can facilitate assessing 22 a corresponding fee. For example, a specific one-time fee may be assessed for each downloaded unique signal. As another example, a fee may be assessed for each time the unique signal is used by a given two-way communication device. As yet another example, a monthly fee may be assessed for so long as a given communication device retains the stored unique signal. Other possibilities exist as well as will be well recognized by those skilled in the art.

Figure 3:
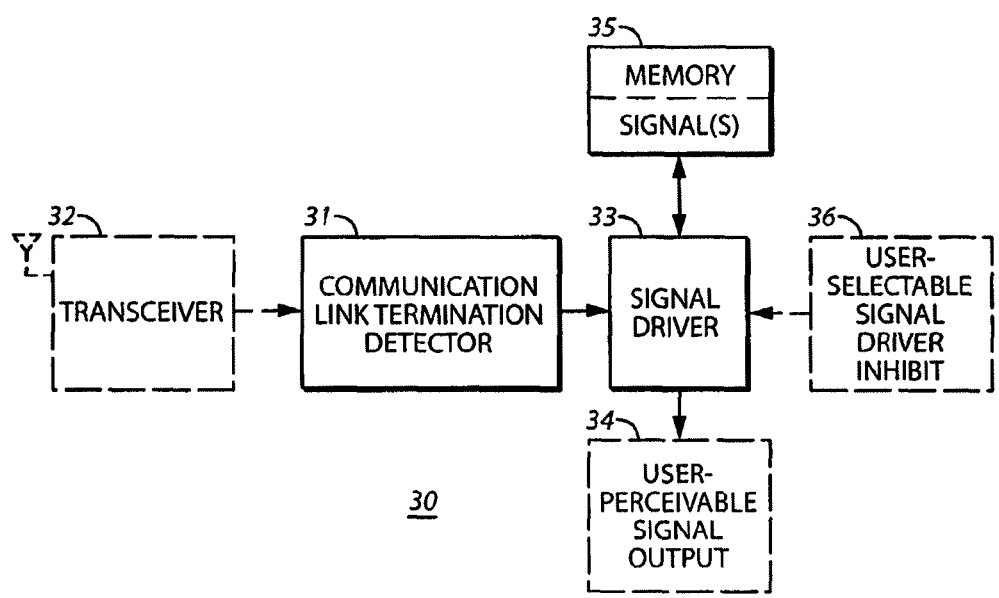
FIG. 3 comprises a block diagram as configured m accordance with various embodiments of the invention.

As noted above, these teachings can be usefully employed in conjunction with a wide variety of communications platforms. In many cases, as will be well understood by those skilled in the art, modem communication devices comprise partially or even wholly programmable platforms that can be readily configured to adopt and implement the described functionality. As a more specific illustrative example, and referring now to FIG. 3, a given communication device 30 can comprise, in relevant part, a communication link termination detector 31 of choice that operably couples to, for example, a transceiver 32. So configured, the communication link termination detector 31 serves, at least in part, to monitor the operation of the transceiver 32 and in particular to detect when a communication link (such as a wireless communication link) being used by the transceiver 32 has been terminated for whatever reason.

The communication link termination detector 31, in turn, operably couples to a signal driver 33 such as, in a preferred approach, an audible signal driver. The latter serves to drive a user perceivable signal output 34 of choice and as may be appropriate to compatibly audibilize the signal content of choice. In a preferred approach, the signal driver 33 operably couples to a memory 35 having one or more audible signals stored therein. So configured, the signal driver 33 can select a particular one of a plurality of stored audible signals when the memory 35 has a corresponding plurality of such signals stored therein.

So configured, those skilled in the art will understand and appreciate that such an apparatus will readily detect the termination of a communication link and respond to such detection by providing a signal, such as an audible signal, that uniquely identifies the communication link termination event. This, in turn, permits a user of the device to be well informed with respect to the presence and/or absence of a viable communication link and can use and leverage that understanding with follow-on actions of choice to best accommodate a given condition.

There may be times, however, when a user may wish to temporarily defeat the above-described operability. For example, a given user may wish to disable this capability for some period of time while engaged in a particular activity or while visiting a particular venue. As another example, a given user may wish to effect an early conclusion of a provided signal during playback. To accommodate such a need, if desired, a user-selectable signal driver inhibit 36 can be operably coupled to the signal driver 33 to permit and facilitate such an action. Such a mechanism can assume any suitable form factor and human-machine interface of choice, including but not limited to push buttons, sliding switches, touch screen displays, a voice recognition interface, and so on.

It should now be evident and clear that these teachings permit a user to be apprised of when a communication link, such as a wireless communication link, has been terminated. This information can be used in various ways. In particular, such an indication can be used to correctly inform a user who otherwise incorrectly believes that a given communication link is available and active. Such an indication, when expected but absent, can also serve to inform a user that a given communication link remains viable and active notwithstanding a contrary user impression. Many users will appreciate that such information, important in and of itself, is also capable of being delivered in a personalized and highly customizable manner. Those skilled in the art will appreciate that these benefits are attainable with little fundamental change to many communication devices being necessary. In general, these teachings can be implemented in a highly cost effective manner.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

What is claimed is:

1. A method comprising:
providing, to a communication device, a plurality of available candidate unique user selectable corresponding signals;
providing, to the communication device, a link detector configured to determine whenever a communication link for the communication device has terminated either intentionally or unintentionally;
providing, to the communication device, a notification system configured to
generate,
in response to determining that the communication link has terminated for whatever reason and without regard as to whether the communication link terminated intentionally or unintentionally and why the communication link has terminated, at the communication device,
a unique user selected corresponding signal by
selecting the unique user selected corresponding signal from amongst the plurality of available candidate unique user selectable corresponding signals to indicate termination of the communication link,
wherein the unique user selected corresponding signal comprises
at least one of musical content and spoken content, and the unique user selected corresponding signal is not used by the communication device for other annunciation or notice.

2. The method of claim 1 wherein selecting the unique user selected corresponding signal includes
retrieving audio signal content from a memory of the communication device and
using the audio signal content to provide the unique user selected corresponding signal.

3. The method of claim 2 wherein
the audio signal content comprises an MP3-compatible audio file.

4. The method of claim 2 wherein
the audio signal content has a duration of at least three minutes.

5. The method of claim 2 wherein
the notification system is configured to limit the audio signal content to a predetermined size.

6. The method of claim 5 wherein
the predetermined size is a duration of time; and
the audio signal content consists of instrumental musical content.

7. The method of claim 1 wherein the step of
providing, to the communication device, the plurality of available candidate unique user selectable corresponding signals
includes
transmitting a first portion of the plurality of available candidate unique user selectable corresponding signals to the communication device, and
transmitting a signal provisioner to the communication device, the signal provisioner providing a second portion of the plurality of available candidate unique user selectable corresponding signals, wherein the second portion is factory preset on the communication device.

8. The method of claim 1 wherein
selecting the unique user selected corresponding signal from amongst the plurality of
available candidate unique user selectable corresponding signals includes
changing the unique user selected corresponding signal from a factory preset signal.

9. The method of claim 1 wherein
the musical content is a polyphonic series of tones.

10. A method comprising:
providing, to a communication device, a plurality of available candidate unique user selectable corresponding signals;
providing, to the communication device, a link detector configured to determine whenever a communication link for the communication device has terminated either intentionally or unintentionally;
providing, to the communication device, a notification system configured to
generate,
in response to determining that the communication link has terminated for whatever reason and without regard as to why the communication link has terminated and whether the communication link terminated intentionally or unintentionally, at the communication device,
a first unique user selected corresponding signal by selecting the first unique user selected corresponding signal from amongst the plurality of available candidate unique user selectable corresponding signals to indicate termination of the communication link,
wherein the first unique user selected corresponding signal comprises
at least one of an audible signal and a haptic signal, and
the first unique user selected corresponding signal is not used by the communication device for other annunciation or notice.

11. The method of claim 10 wherein
the notification system is configured to
generate,
in response to determining that the communication link has terminated for whatever reason and without regard as to why the communication link has terminated,
at the communication device,
a second unique user selected corresponding signal by selecting the second unique user selected corresponding signal from amongst the plurality of available candidate unique user selectable corresponding signals to indicate termination of the communication link,
wherein
the first unique user selected corresponding signal is the audible signal and
the second unique user selected corresponding signal is the haptic signal.

12. The method of claim 10 wherein
the plurality of available candidate unique user selectable corresponding signals includes both the audible signal and the haptic signal.

13. The method of claim 12 wherein
selecting the first unique user selected corresponding signal from amongst the plurality of available candidate unique user selectable corresponding signals
includes
changing the first unique user selected corresponding signal from a factory preset signal.

14. The method of claim 13 wherein
the notification system is configured to defeat the generation of the first unique user selected corresponding signal upon a user request.

15. The method of claim 10
wherein the first unique user selected corresponding signal is an MP3-compatible audio file;
wherein the step of
providing, to the communication device, the plurality of available candidate
unique user selectable corresponding signals
includes
transmitting a first portion of the plurality of available candidate unique user selectable corresponding signals to the communication device, and
transmitting a signal provisioner to the communication device, the signal provisioner providing a second portion of the plurality of available candidate unique user selectable corresponding signals, wherein the second portion is factory preset on the communication device; and
wherein
selecting the first unique user selected corresponding signal from amongst the plurality of available candidate unique user selectable corresponding signals
includes
changing the first unique user selected corresponding signal from a factory preset signal.

16. A communication device having a communication link termination detector that detects intentional and unintentional terminations of a communication link being used by the communication device, the communication device comprising:
at least one stored audible signal that identifies a termination event, wherein the at least one stored audible signal comprises a user selectable signal comprising at least one of musical content and spoken content;
an audible signal driver that is operably coupled to the at least one stored audible signal and responsive to the communication link termination detector, such that the audible signal driver is configured to cause, regardless of whether the termination is intentional or unintentional, the at least one stored audible signal to be rendered audible in response to the communication link termination detector detecting the termination of the communication link to thereby uniquely indicate that the communication link has been terminated, wherein the at least one stored audible signal is not used by the communication device for other annunciation or notice.

17. The communication device of claim 16 wherein
the musical content is a polyphonic series of tones.

18. The communication device of claim 16 further comprising:
 a factory default signal, and
 a selection system configured to receive a user selection and replace the factory default signal with the at least one stored audible signal that comprises the user selectable signal.

19. The communication device of claim 18 wherein the selection system limits the at least one stored audible signal to a predetermined size.

\* \* \* \* \*